(12) United States Patent
Zhuang et al.

(10) Patent No.: US 6,894,750 B2
(45) Date of Patent: May 17, 2005

(54) TRANSFLECTIVE COLOR LIQUID CRYSTAL DISPLAY WITH INTERNAL REAR POLARIZER

(75) Inventors: Zhiming Zhuang, Buffalo Grove, IL (US); Robert B. Akins, Palatine, IL (US); Robert D. Polak, Lindenhurst, IL (US)

(73) Assignee: Motorola Inc., Schaumburg, IL (US)

( * ) Notice: Subject to any disclaimer, the term of this patent is extended or adjusted under 35 U.S.C. 154(b) by 63 days.

(21) Appl. No.: 10/427,947

(22) Filed: May 1, 2003

(65) Prior Publication Data

US 2004/0218121 A1 Nov. 4, 2004

(51) Int. Cl.⁷ .............................. G02F 1/1335
(52) U.S. Cl. .................. 349/114; 349/106; 349/96
(58) Field of Search ................. 349/106, 96, 114

(56) References Cited

U.S. PATENT DOCUMENTS

| | | | |
|---|---|---|---|
| 6,204,902 B1 * | 3/2001 | Kim et al. ............... | 349/112 |
| 6,317,181 B1 | 11/2001 | Hoshino | |
| 6,493,051 B2 | 12/2002 | Ha et al. | |
| 6,686,980 B1 * | 2/2004 | Ichihashi .................. | 349/96 |
| 2002/0036730 A1 | 3/2002 | Back et al. | |
| 2002/0105608 A1 * | 8/2002 | Lazarev ................... | 349/96 |
| 2002/0145688 A1 | 10/2002 | Sekiguchi | |
| 2002/0154257 A1 | 10/2002 | Iijima | |
| 2002/0180911 A1 * | 12/2002 | Iijima ..................... | 349/114 |
| 2002/0180913 A1 * | 12/2002 | Wu et al. ................. | 349/115 |
| 2003/0210369 A1 * | 11/2003 | Wu ......................... | 349/114 |
| 2004/0027510 A1 * | 2/2004 | Iijima et al. .............. | 349/61 |
| 2004/0036817 A1 * | 2/2004 | Paukshto et al. .......... | 349/56 |

OTHER PUBLICATIONS

Webster E. Howard, "Organic Light Emitting Diodes (OLED)", OLED Technology Primer, 2001, 4 pages.
Tatiana Sergan, Tod Schneider, Jack Kelly, O.D. Lavrentovich, "Polarizing–alignment layers for twisted nematic cells", Liquid Crystals, 2000, vol. 27, No. 5, 567–572.

* cited by examiner

*Primary Examiner*—Kenneth Parker
(74) *Attorney, Agent, or Firm*—Sylvia Chen

(57) ABSTRACT

A transflective color liquid crystal display (200) with internal rear polarizer (275) has a front polarizer (260), a front substrate (210), a first color filter layer (212), a front transparent electrode (240), a liquid crystal layer (250), a rear transparent electrode (230), a rear polarizer (275), a reflector (235), and a rear substrate (220). The inclusion of an internal rear polarizer (275) results in little optical path difference between a reflective mode and a transmissive mode of the transflective color LCD (200). The internal rear polarizer (275) also results in little parallax, because the internal reflector (235) is very close to an image-forming layer (250). Additionally, a second color filter layer (214) can be added behind the internal reflector (235) to enhance the brightness and color saturation of the transflective color LCD (200) with internal rear polarizer (275) during the transmissive mode.

14 Claims, 5 Drawing Sheets

TRANSFLECTIVE COLOR LIQUID CRYSTAL DISPLAY WITH INTERNAL REAR POLARIZER

FIELD OF THE DISCLOSURE

This disclosure relates generally to liquid crystal displays (LCDs), and more particularly to transflective color LCDs.

BACKGROUND OF THE DISCLOSURE

Color LCDs have become key components in portable electronic devices. In particular, users of mobile telephones, portable electronic games, personal digital assistants (PDAs), and other handheld electronic devices expect the display performance of their portable electronic device to be similar to that of a laptop personal computer in the backlight mode with respect to characteristics such as brightness and color saturation. Additionally, users expect the displays for portable electronic devices to maintain good readability in both indoor and outdoor environments, including those with high ambient light. Thus, transflective LCDs exist that operate in both a transmissive (backlight) mode and a reflective (ambient light) mode.

Throughout this specification, "front" shall refer to portions of an LCD that are closer to a viewer and "rear" shall refer to portions of an LCD that are farther away from a viewer. In the drawings, elements that are in the "front" are visually above elements that are in the "rear."

FIG. 3 shows a related art transflective color LCD 300 with an internal reflector 335. A front substrate 310, usually constructed of glass, has a color filter 312 on a rear surface and a front polarizer 360 on a front surface. A rear substrate 320, usually constructed of glass, has an internal reflector 335 formed on a front surface and a rear polarizer 370 on a rear surface. Between the front substrate 310 with associated elements 360, 312 and the rear substrate 320 with associated elements 335, 370, lies a liquid crystal layer 350 sandwiched between a front transparent electrode 340 and a rear transparent electrode 330. Furthermore, a backlight sub-system 380 is disposed behind the rear polarizer 370 and functions as a light source during the transmissive mode.

Arrow 393 demonstrates the operating principles of the transflective color LCD 300 with an internal reflector 335 during the transmissive mode. Light generated from the backlight sub-system 380 passes through the rear polarizer 370, the rear substrate 320, the internal reflector 335, the rear transparent electrode 330, the liquid crystal layer 350, the front transparent electrode 340, the color filter 312, the front substrate 310, and the front polarizer 360. Arrow 391 demonstrates the operating principles of the transflective color LCD 300 with an internal reflector 335 during the reflective mode. Ambient light passes through the front polarizer 360, the front substrate 310, the color filter 312, the front transparent electrode 340, the liquid crystal layer 350, the rear transparent electrode 330, reflects on the surface of internal reflector 335, redirects toward the front substrate 310, and passes back through the front polarizer 360.

In this transflective color LCD 300 with an internal reflector 335, an optical path in the reflective mode, as indicated by arrow 391, differs significantly from an optical path in the transmissive mode, as indicated by arrow 393. These differing optical paths affect several display characteristics noticeable to the user, such as color saturation and brightness. For example, color purity is affected by the fact that light rays pass through the color filter 312 twice in the reflective mode and only once in the transmissive mode.

To rectify this situation, there are transflective color LCDs with a dual cell gap construction. For example as shown in FIG. 4, the color filter 412 is varied so that there are reflective regions with lower dye density color filtering and transmissive regions with higher dye density color filtering. Then, the internal reflector 435 is patterned and aligned with the reflective and transmissive regions of the color filter so that lights rays are reflected through thinner liquid crystal regions and transmitted through thicker liquid crystal regions. Finally, the transition areas between the reflective regions and transmissive regions are masked to reduce light leakage.

The remainder of the transflective color LCD 400 is similar to that shown in FIG. 3. A front substrate 410, usually constructed of glass, has a front transparent electrode 440 and a color filter 412 on a rear surface and a front polarizer 460 on a front surface. A rear substrate 420, usually constructed of glass, has a patterned internal reflector 435 formed on a front surface and a rear polarizer 470 on a rear surface. Between the front substrate 410 with associated elements 460, 440, 412 and the rear substrate 420 with associated elements 435, 470, lies a varied liquid crystal layer 450 sandwiched between the front color filter 412 and a rear transparent electrode 430. Furthermore, a backlight sub-system 480 is disposed behind the rear polarizer 470 and functions as a light source during the transmissive mode.

Dual-cell gap construction compensates for the differing optical paths in the transflective color LCD 400 with an internal reflector 435 but results in a complicated manufacturing process, including additional mask and process steps, which results in a higher manufacturing cost. Additionally, the masking itself causes lower brightness for the transflective color LCD 400.

We turn now to another transflective color LCD that does not have the optical path problem of the transflective color LCD 300 with an internal reflector, nor the complicated manufacturing process of the transflective color LCD 400 with a dual cell gap construction, but instead has a parallax problem. FIG. 5 shows a related art transflective color LCD 500 with an external reflector 575. A front substrate 510, usually constructed of glass, has a color filter 512 on a rear surface and a front polarizer 560 on a front surface. A rear substrate 520, usually constructed of glass, has a rear polarizer 570 on a rear surface and an external reflector 575 behind the rear polarizer 570. Between the front substrate 510 with associated elements 560, 512 and the rear substrate 520 with associated elements 570, 575 lies a liquid crystal layer 550 sandwiched between a front transparent electrode 540 and a rear transparent electrode 530. Furthermore, a backlight sub-system 580 is disposed behind the external reflector 575 and functions as a light source in the transmissive mode.

Arrow 593 demonstrates the operating principles of the transflective color LCD 500 with an external reflector 575 during the transmissive mode. Light generated from the backlight sub-system 580 passes through the external reflector 575, the rear polarizer 570, the rear substrate 520, the rear transparent electrode 530, the liquid crystal layer 550, the front transparent electrode 540, the color filter 512, the front substrate 510, and the front polarizer 560. Arrows 591, 592 demonstrate the operating principles of the transflective color LCD 500 with an external reflector 575 during the reflective mode. As shown by arrow 591, ambient light passes through the front polarizer 560, the front substrate 510, the color filter 512, the front transparent electrode 540, the liquid crystal layer 550, the rear transparent electrode 530, the rear substrate 520, and the rear polarizer 570. Then, as shown by arrow 592, the light rays are reflected by the external reflector 575 and redirected back through the rear polarizer 570, the rear substrate 520, the transparent electrode 530, the liquid crystal layer 550, the front transparent electrode 540, the color filter 512, the front substrate 510, and the front polarizer 560.

Arrow 592 indicates the optical path in the reflective mode, while arrow 593 indicates the optical path in the transmissive mode. Note that arrow 591 is not included in the reflective optical path because the rear polarizer 570 resets the optical effects of the light rays. As shown in FIG. 5, there is little difference in the two optical paths. There is, however, a parallax problem due to the significant distance 596 between the external reflector 575 and the liquid crystal layer 550 given that the rear substrate 520 has a thickness of approximately 500 micrometers and the rear polarizer has a thickness of approximately 100 micrometers. Thus, in the reflective mode, the pixel on the incoming light rays shown by arrow 591 may be different from the pixel on the outgoing light rays shown by arrow 592. This becomes more of a problem as pixels get smaller, which is the trend in LCDs and especially color LCDs.

Thus, there is a need for a transflective color LCD that avoids the problems of significantly differing optical paths and complicated construction but does not have the parallax problems caused by significant distance between an image-forming layer (e.g., a liquid crystal layer) and a reflector. The various aspects, features and advantages of the disclosure will become more fully apparent to those having ordinary skill in the art upon careful consideration of the following Drawings and accompanying Detailed Description.

DETAILED DESCRIPTION OF THE PREFERRED EMBODIMENTS

A transflective color liquid crystal display with internal rear polarizer has a front polarizer, a front substrate disposed behind the front polarizer, a first color filter layer disposed behind the front substrate, a front transparent electrode disposed behind the first color filter layer, a liquid crystal layer disposed behind the front transparent electrode, a rear transparent electrode disposed behind the liquid crystal layer, a rear polarizer disposed behind the rear transparent electrode, a reflector disposed behind the rear polarizer, and a rear substrate disposed behind the reflector.

A transflective color LCD with internal rear polarizer has a rear polarizer in front of an internal reflector. The internal rear polarizer results in little optical path difference between a reflective mode and a transmissive mode of the transflective color LCD with internal rear polarizer. The internal rear polarizer also results in little parallax, because the internal reflector is very close to an image-forming layer. Additionally, a second color filter layer can be added behind the internal reflector to enhance the brightness and color saturation of the transflective color LCD with internal rear polarizer during the transmissive mode.

A transflective color LCD with internal rear polarizer eliminates the need for a dual cell gap construction, because the optical path is similar in both the transmissive (backlight) mode and the reflective (ambient light) mode. Elimination of the dual cell gap construction simplifies manufacturing, which results in a lower manufacturing cost. A transflective color LCD with internal rear polarizer also resolves parallax problems because the internal reflector is only micrometers away from the image-forming liquid crystal layer. Furthermore, a patterned photoluminescence color-converting layer behind the internal reflector enhances a color purity of each pixel and provides an independent means to enhance the color saturation and brightness of a transflective color LCD having an internal rear polarizer when in a transmissive mode.

Figure 1:
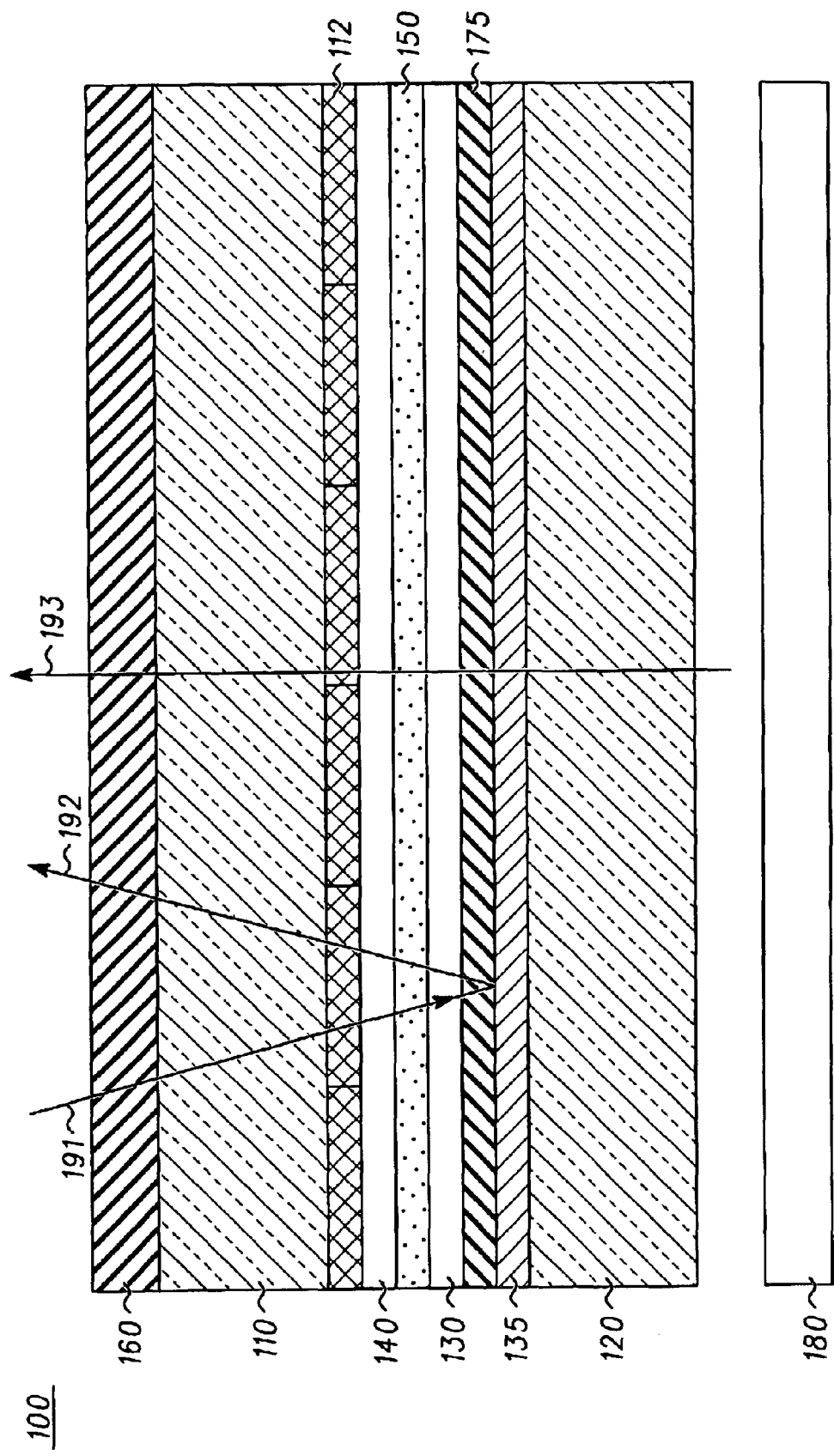
FIG. 1 shows a first preferred embodiment of a transflective color LCD having an internal rear polarizer.

FIG. 1 shows a first preferred embodiment of a transflective color LCD 100 having an internal rear polarizer 175. A front substrate 110, usually constructed of glass, has a color filter layer 112 behind a rear surface and a front polarizer 160 in front of a front surface. A rear substrate 120, usually constructed of glass, has an internal reflector 135 in front of a front surface and an internal rear polarizer 175 in front of the internal reflector 135. Between the front substrate 110 with associated elements 160, 112 and the rear substrate 120 with associated elements 135, 175 lies a liquid crystal layer 150 sandwiched between a front transparent electrode 140 and a rear transparent electrode 130. Furthermore, a backlight sub-system 180 is disposed behind the rear substrate 120 and functions as a light source in the transmissive mode.

Arrow 193 demonstrates the operating principles of the transflective color LCD 100 having an internal rear polarizer 175 during the transmissive mode. Light generated from the backlight sub-system 180 passes through the rear substrate 120, the internal reflector 135, the internal rear polarizer 175, the rear transparent electrode 130, the liquid crystal layer 150, the front transparent electrode 140, the color filter layer 112, the front substrate 110, and the front polarizer 160. Arrows 191, 192 demonstrate the operating principles of the transflective color LCD 100 having an internal rear polarizer 175 during the reflective mode. As shown by arrow 191, ambient light passes through the front polarizer 160, the front substrate 110, the color filter layer 112, the front transparent electrode 140, the liquid crystal layer 150, the rear transparent electrode 130, and the internal rear polarizer 175. Then, as shown by arrow 192, the light rays are reflected by the internal reflector 135 and redirected back through the internal rear polarizer 175, the transparent electrode 130, the liquid crystal layer 150, the front transparent electrode 140, the color filter layer 112, the front substrate 110, and the front polarizer 160.

Arrow 192 indicates the optical path in the reflective mode, while arrow 193 indicates the optical path in the transmissive mode. Note that arrow 191 is not included in the optical path because the internal rear polarizer 175 resets the optical effects of the light rays. As shown in FIG. 1, there is little difference in the two optical paths. Additionally, no parallax problem is introduced, because the distance between the internal rear reflector 135 and the image-forming elements (e.g., the liquid crystal layer 150 and the color filter layer 112 is 10 micrometers or less.

Figure 2:
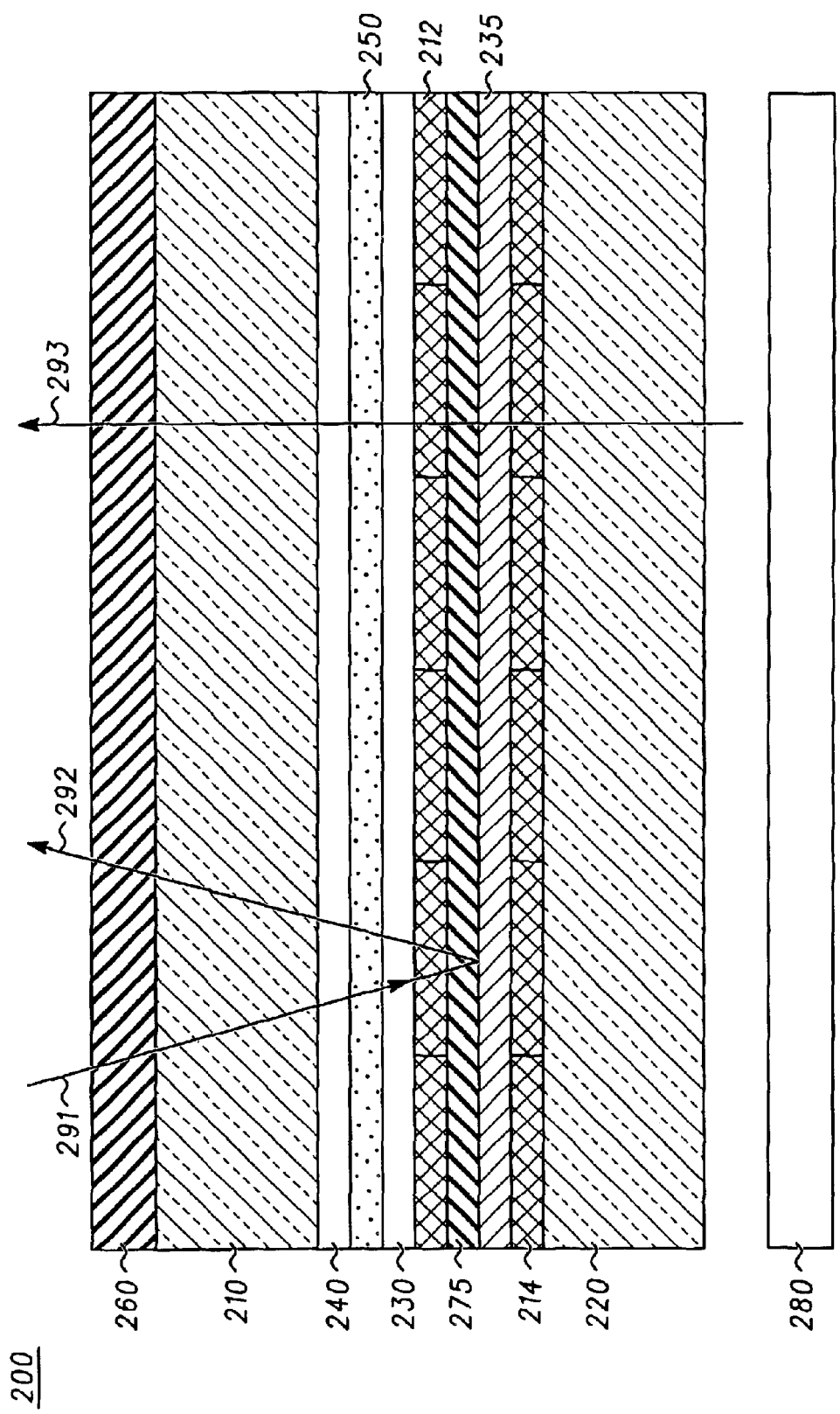
FIG. 2 shows a second preferred embodiment of a transflective color LCD having an internal rear polarizer.
Figure 3:
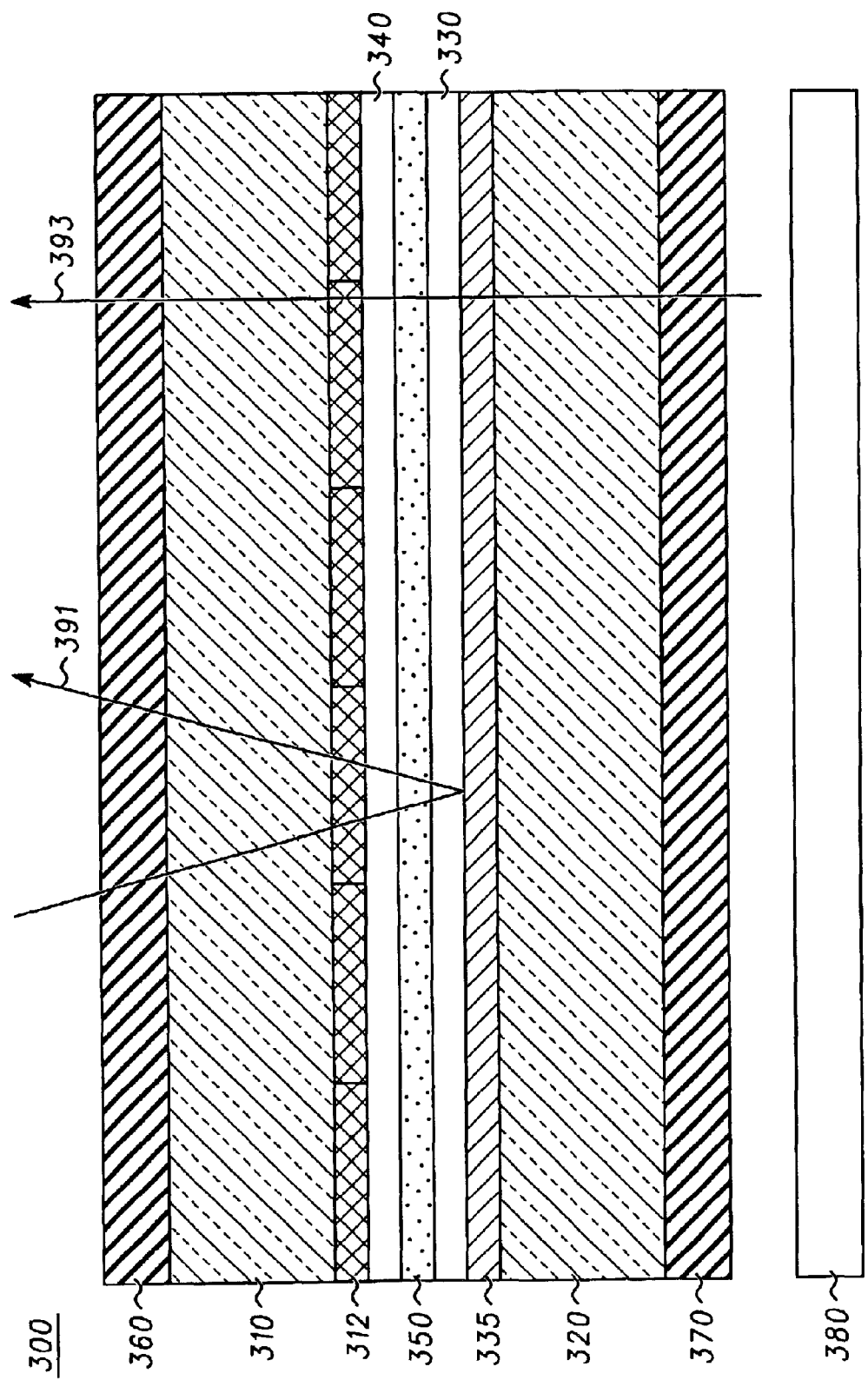
FIG. 3 shows a related art transflective color LCD with an internal reflector.
Figure 4:
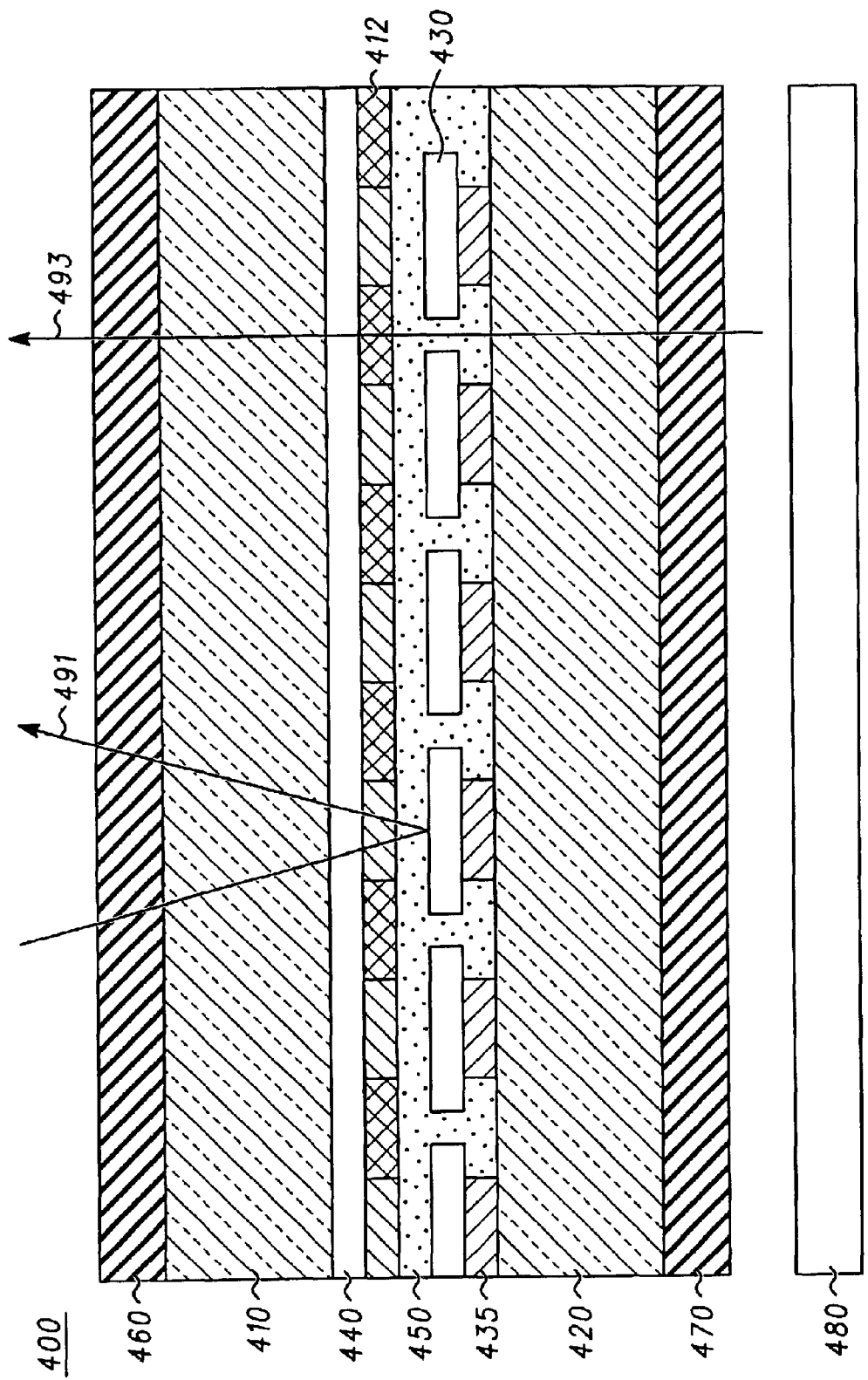
FIG. 4 shows a related art transflective color LCD with dual cell gap construction.
Figure 5:
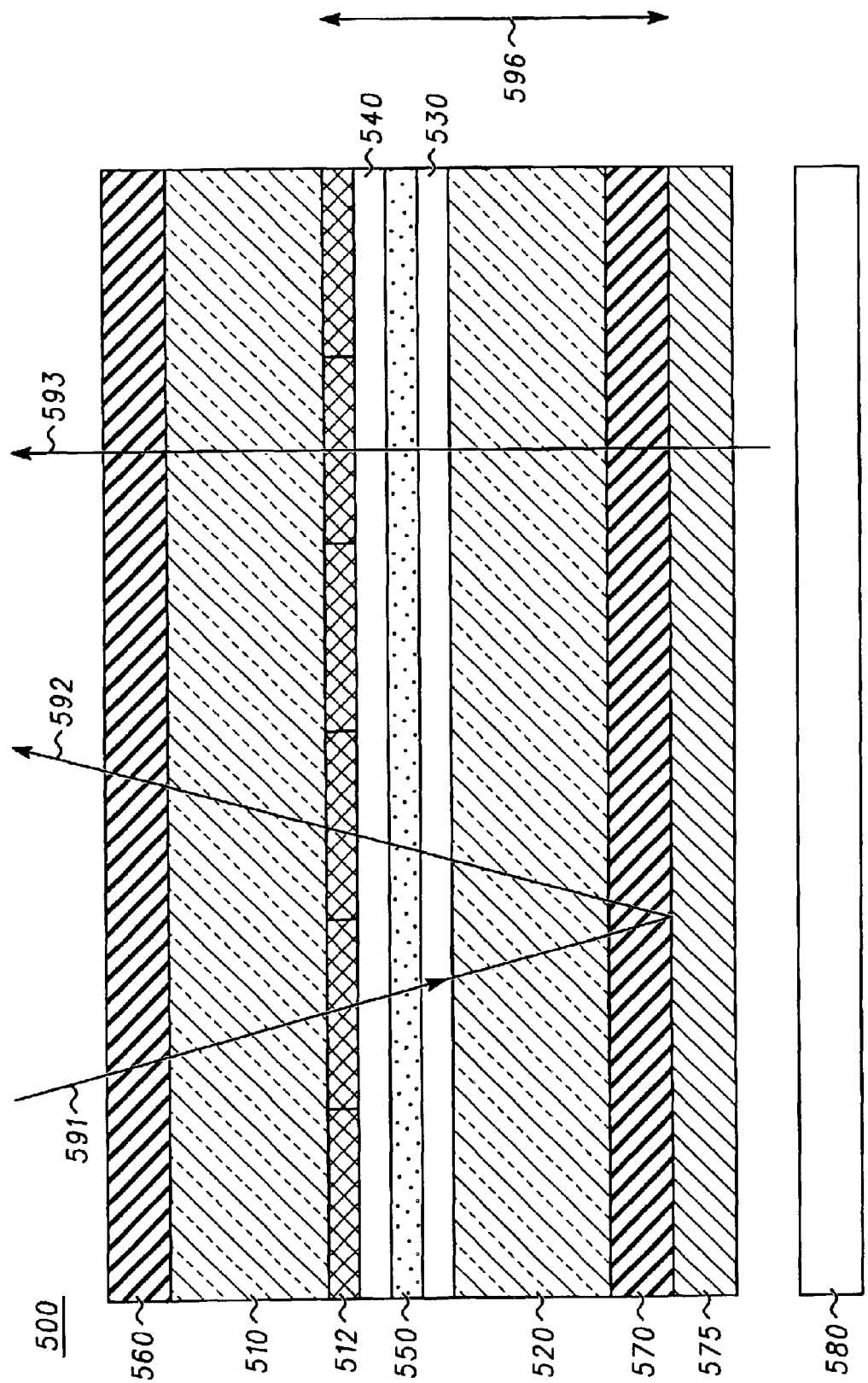
FIG. 5 shows a related art transflective color LCD with an external reflector.

One difference in the transmissive and reflective optical paths of the transflective color LCD 100 having an internal rear polarizer 175 is that the light rays in the reflective mode are color filtered twice while the light rays in the transmissive mode are color filtered once. Note that any position of the color filter layer 112 in front of the internal reflector 135 results in this effect. FIG. 2 shows a second preferred embodiment of a transflective color LCD 200 having an internal rear polarizer 275. This second embodiment compensates for the fact that the light rays in the reflective mode are color filtered twice by adding a second color filter layer 214, which affects light rays in the transmissive mode. An alternative to a second color filter layer 214 is to vary the dye density in a single color filter layer similar to that shown by color filter 412 in FIG. 4. There are, however, advantages to providing a second color filter layer as will be described below.

A front substrate 210, usually constructed of glass, has a front polarizer 260 in front of a front surface. A rear substrate 220, usually constructed of glass, has a second color filter layer 214 in front of a front surface, an internal reflector 235 in front of the second color filter layer 214, an internal rear polarizer 275 in front of the internal reflector 235, and a first color filter layer 212 in front of the internal rear polarizer 275. The second color filter layer 214 preferably has a photo-luminescent color filter; however, the use of standard color filters for both the first color filter layer 212 and the second color filter layer 214 can achieve the objective of independently controlling color saturation in both transmissive and reflective modes.

Between the front substrate 210 with associated element 260 and the rear substrate 220 with associated elements 212, 214, 235, 275 lies a liquid crystal layer 250 sandwiched between a front transparent electrode 240 and a rear transparent electrode 230. Furthermore, a backlight sub-system 280 is disposed behind the rear substrate 220 and functions as a light source in the transmissive mode.

Arrow 293 demonstrates the operating principles of the transflective color LCD 200 having an internal rear polarizer 275 during the transmissive mode. Light generated from the backlight sub-system 280 passes through the rear substrate 220, the second color filter layer 214, the internal reflector 235, the internal rear polarizer 275, the first color filter layer 212, the rear transparent electrode 230, the liquid crystal layer 250, the front transparent electrode 240, the front substrate 210, and the front polarizer 260. Arrows 291, 292 demonstrate the operating principles of the transflective color LCD 200 having an internal rear polarizer 275 during the reflective mode. As shown by arrow 291, ambient light passes through the front polarizer 260, the front substrate 210, the front transparent electrode 240, the liquid crystal layer 250, the rear transparent electrode 230, the first color filter layer 212, and the internal rear polarizer 275. Then, as shown by arrow 292, the light rays are reflected by the internal reflector 235 and redirected back through the internal rear polarizer 275, the first color filter layer 212, the transparent electrode 230, the liquid crystal layer 250, the front transparent electrode 240, the front substrate 210, and the front polarizer 260.

Arrow 292 indicates the optical path in the reflective mode, while arrow 293 indicates the optical path in the transmissive mode. Note that arrow 291 is not included in the optical path because the internal rear polarizer 275 resets the optical effects of the light rays. As shown in FIG. 2, there is little difference in the two optical paths. Additionally, no parallax problem is introduced, because the distance between the internal rear reflector 235 and the liquid crystal layer 250 is approximately 10 micrometers or less.

Still further advantages can be obtained by using photo-luminescent material in the second color filter layer 214. Photoluminescent material converts undesired wavelengths into desired wavelengths, which results in higher light energy efficiency and thus increased brightness. Using a photoluminescent material that converts light from a longer wavelength to a shorter wavelength allows the backlight sub-system to be either a standard white backlight sub-system or a monochromatic backlight sub-system producing wavelengths such as ultraviolet or blue. Using standard color filter technology in the first color filter layer 212 adds good color purity to the increased brightness achieved by a photoluminescent second color filter layer when in a transmissive mode. Thus, a photoluminescent second color filter layer 214 in conjunction with a standard first color filter layer 212 enhances the performance of a white backlight and also allows additional backlight options.

An advantage to this approach is that an internal rear polarizer affects light the reflective mode, thus allowing similar optical paths in both the transmissive and reflective modes. Similar optical paths in both modes allows for simpler, non-dual cell, construction which in turn allows lower manufacturing costs. Another advantage is that an internal reflector reduces parallax, because there is only a very short (several micrometers) distance between the internal reflector and the liquid crystal layer. Thus, a transflective color LCD with internal rear polarizer is a simple, low-cost alternative to dual-cell gap construction transflective color LCDs yet allows for similar optical paths without introducing parallax.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims.

We claim:

1. A transflective color liquid crystal display comprising:
   a front polarizer;
   a front substrate disposed behind the front polarizer;
   a front transparent electrode disposed behind the front substrate;
   a liquid crystal layer disposed behind the front transparent electrode;
   a rear transparent electrode disposed behind the liquid crystal layer;
   a rear polarizer disposed behind the rear transparent electrode;
   a reflector disposed behind the rear polarizer;
   a first color filter layer disposed behind the front substrate and in front of the reflector;
   a rear substrate disposed behind the reflector; and
   a second color filter layer disposed behind the reflector.

2. A transflective color liquid crystal display according to claim 1, wherein the second color filter layer has a photo-luminescent color filter.

3. A transflective color liquid crystal display according to claim 2, further comprising:
   a backlight sub-system disposed behind the rear substrate.

4. A transflective color liquid crystal display according to claim 3 wherein the backlight sub-system is a monochromatic backlight sub-system.

5. A transflective color liquid crystal display according to claim 4 wherein the monochromatic backlight sub-system produces ultraviolet wavelengths.

6. A transflective color liquid crystal display according to claim 4 wherein the monochromatic backlight sub-system produces blue wavelengths.

7. A transflective color liquid crystal display according to claim 1 further comprising:
a backlight sub-system disposed behind the rear substrate.

8. A portable electronic device with a transflective color liquid crystal display comprising:
- a front polarizer;
- a front substrate;
- a rear substrate;
- an image forming layer disposed between the front substrate and the rear substrate;
- a polarizer disposed between the image forming layer and the rear substrate;
- a reflector disposed between the polarizer and the rear substrate;
- a first color filter layer disposed in front of the reflector; and
- a second color filter layer disposed behind the reflector.

9. A portable electronic device with a transflective color liquid crystal display according to claim 8 wherein the second color filter layer comprises photoluminescent material.

10. A portable electronic device with a transflective color liquid crystal display according to claim 9 further comprising:
a backlight sub-system disposed behind the rear substrate.

11. A portable electronic device with a transflective color liquid crystal display according to claim 10 wherein the backlight sub-system is a monochromatic backlight sub-system.

12. A portable electronic device with a transflective color liquid crystal display according to claim 11 wherein the monochromatic backlight sub-system produces ultraviolet wavelengths.

13. A portable electronic device with a transflective color liquid crystal display according to claim 11 wherein the monochromatic backlight sub-system produces blue wavelengths.

14. A portable electronic device with a transflective color liquid crystal display according to claim 8 further comprising:
a backlight sub-system disposed behind the rear substrate.

* * * * *